Feb. 17, 1948. W. BUEHLER 2,436,034
PUMP WITH ROTARY CASING
Filed Nov. 13, 1942 2 Sheets-Sheet 1
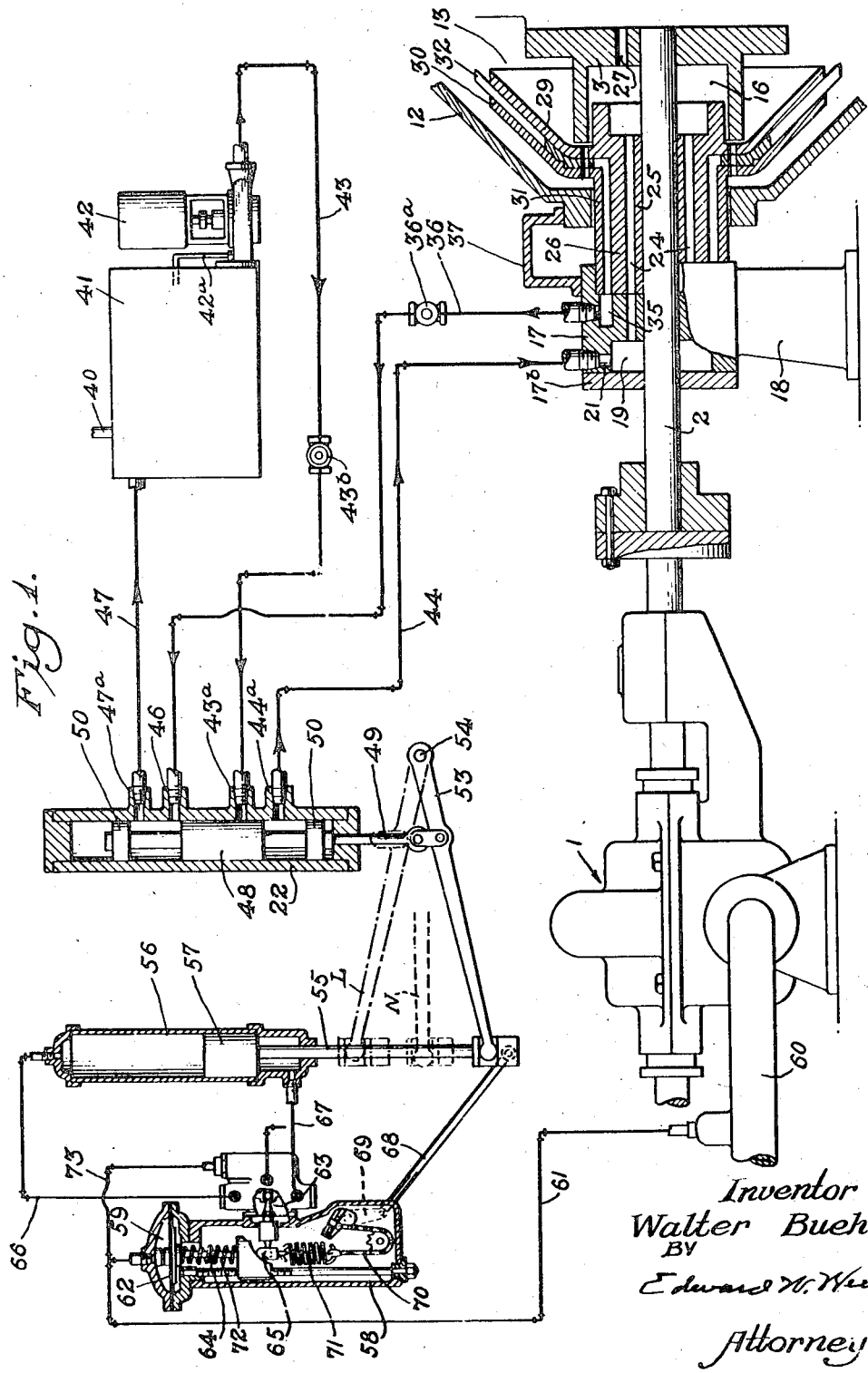
Inventor
Walter Buehler
BY
Edward W. Weikert
Attorney.

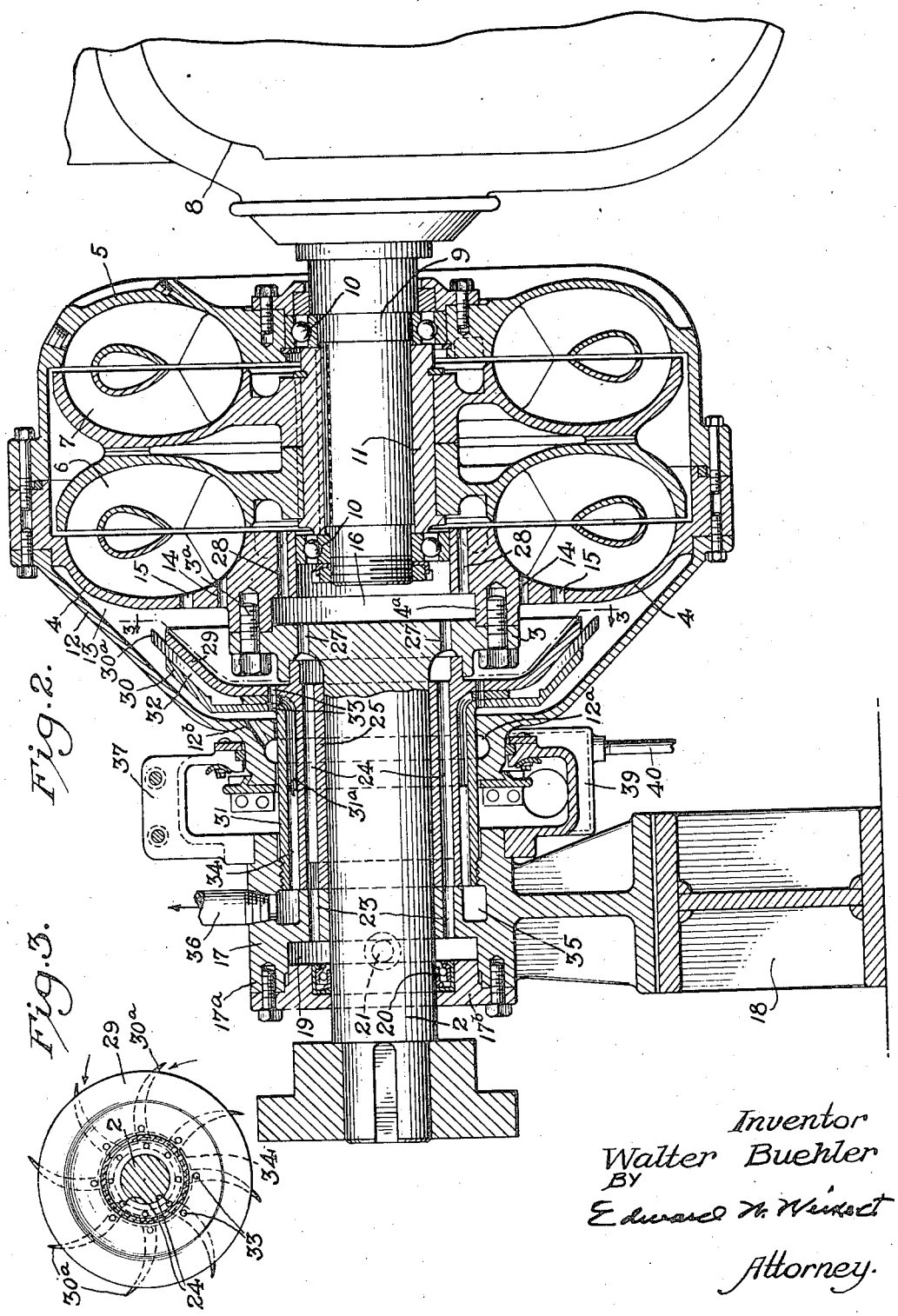

Patented Feb. 17, 1948

2,436,034

UNITED STATES PATENT OFFICE 2,436,034

PUMP WITH ROTARY CASING

Walter Buehler, Hamilton, Ohio, assignor to Economy Pumps, Inc., Hamilton, Ohio, a corporation of Illinois Application November 13, 1942, Serial No. 465,816

5 Claims. (Cl. 103—101)

This invention relates to an automatic control for fluid couplings and the like and concerns itself primarily with means for automatically varying the effectiveness of the fluid coupling for maintaining a predetermined pressure or work result.

In the present embodiment of the invention, the apparatus is shown in connection with a water pumping system to which it is admirably adapted though not limited thereto, since the invention can be used for controlling different kinds of driven units.

In municipal water power plants, at various hours during the day, the discharge load in the distributing piping of a station swings from a minimum to a maximum and a speed regulation of the pump is required to maintain a constant pressure in the system under variable load and under a constant driving speed of the driving motor.

To accomplish the desired result in water power plants and the like, a fluid which is preferably a thin oil is supplied to and withdrawn from the coupling to vary its effectiveness in response to the pressure in the water discharge line of the pump. For example, if the pressure in the water discharge line rises too high or above the predetermined pressure desired in the pump, the system automatically acts to withdraw fluid from the coupling whereby the speed of the pump is reduced. On the other hand, if the pressure in the water discharge line drops below the predetermined pressure desired, the system automatically acts to prevent the withdrawal of fluid from the coupling and to supply more fluid to the coupling for increasing the speed of the pump. In both cases, when the predetermined pressure and the speed of the pump to produce that pressure have been attained, the system operates in what may be termed a normal position.

In the case of other driven units, the effectiveness of the coupling can be varied in accordance with the delivered force or pressure in a manner as herein set forth.

In its broadest aspects, the invention seeks to provide automatic speed control between a constant driving member and a variable driven member thru the instrumentality of a fluid coupling which has a responsive relation with respect to delivered force or pressure or the like.

In its more specific aspects, the invention consists in a fluid control system for a fluid coupling, in which the amount of fluid can be automatically varied thru the instrumentality of valves which are automatically operated by mechanism directly responsive to delivered pressure or the like; the centrifugal force of the coupling being utilized to expel fluid from the coupling when delivered pressure is being lowered.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 1 is a diagrammatic view with parts of the apparatus shown in section involving this invention.

Fig. 2 is an enlarged sectional view thru a fluid coupling and fluid distributing mechanism involving this invention and adapted for incorporation in the system shown in Fig. 1.

Fig. 3 is a sectional view taken substantially upon the line 3—3 of of Fig. 2 looking in the direction of the arrows.

In referring now to the drawings, there is shown in Fig. 1 a driven unit in the form of a centrifugal pump 1. The pump 1 is operatively connected to a stub shaft 2 which has a head 3 at its free end that is connected to the turbine blade 4 of the fluid coupling by screw bolts 3a as shown in Fig. 2. The turbine blade is connected to an oppositely facing turbine blade 5. Between the turbine blades are a pair of pump impeller blades or elements 6 and 7 which respectively co-operate with the turbine blades 4 and 5 for imparting thru the fluid, rotation to the stub shaft 2 and pump 1 is well known in the art.

A driving unit in the form of a motor 8 having a shaft 9 to which are keyed the hubs of the impeller blades 6 and 7 constitutes the driving force for the pump. It will be noted that the shaft 9 is mounted in ball bearings 10 with a spacer sleeve 11 therebetween which is keyed to the shaft 9 and the impeller blades 6 and 7 whereby rotation is adapted to be imparted to such blades.

A cover member 12 is secured to the turbine blade 4 and extends over a portion of the pump shaft 2 and defines a fluid chamber 13 between it and the turbine blade 4. The turbine blade 4 is provided with ports 14 and 15 which establish communication between said chamber and said coupling. It will be noted that the connection between the coupling and the pump shaft 2 is effected thru an annular boss 4a on the turbine blade which is bolted to the head of said shaft by the forementioned bolts 3a. This construction forms a chamber 16 between the driving and driven mechanisms. It might be mentioned that the chamber 16 communicates with the fluid inlet port while the chamber 13 communicates with the fluid outlet port as will later more fully appear.

The stub shaft 2 is mounted within a fluid distributing bracket 17 which has a leg 18 resting upon some suitable foundation. This bracket 17 has an annular rearwardly extending flange 17a which is spaced from the shaft 2. A fluid sealing collar 17b has a reduced portion which telescopes under the flange 17a and is secured to the end of the flange. This construction provides a fluid chamber 19 beneath said flange. The collar may be provided with any suitable packing 20 adjacent the shaft 2. The bracket 17 is provided with a suitable fluid inlet port 21 leading to chamber 19. This port 21 may be located at any suitable point for a pipe connection to the selector valve 22 (Fig. 1) for supplying fluid to the chamber 19.

The bracket 17 is provided with fluid passages 23 which communicate with the fluid chamber 19 and with fluid passages 24 in a sleeve 25 surrounding shaft 2. The head of shaft 2 is provided with ports or passages 27 thru which the fluid from passages 24 passes on its way to chamber 16.

From the cylindrical chamber 16, the fluid will flow thru suitable passages 28 in the turbine member 4 and enter the coupling. From the coupling, the fluid can emerge thru ports 14 and 15 to the fluid chamber 13 from which the fluid is adapted to be expelled under predetermined conditions by means of fluid expelling mechanism co-operating with the rotation of the coupling.

The fluid expelling mechanism which is located in the fluid outlet chamber 13 adjacent the coupling comprises a pair of spaced flanges 29 and 30, the former of which is integral with and extends from the sleeve 25 while the latter is integral with and extends from a sleeve 31 which surrounds the shaft 2 in spaced relation to sleeve 25 and threaded in bracket 17. These flanges extend at an angle of about 45 degrees from about their middle toward the coupling and they define a passage 32 therebetween. At spaced intervals, curved blades 30a having attaching portions secured to the flange 29 within the passage 32 extend a distance beyond the ends of the flanges and form the main part of the fluid expelling mechanism in that they receive the impulses of the fluid thru the rotation of the coupling. These ever present impulses force the fluid against the blades and thru the passage 32 and ultimately to the fluid supply tank as will later more fully appear. The flanges 29 and 30 may be provided with holes 33 at their bases for the escape of entrapped fluid and air behind the flange 30.

The annular passage 32 communicates with an annular passage 34 formed between the sleeves 25 and 31. The sleeve 31 may be maintained in proper spaced relation with respect to sleeve 25 by ribs 31a. The passage 34 communicates with an annular discharge chamber 35 formed in the bracket 17 at the end of the sleeve 31. A fluid return pipe 36 equipped with a globe valve 36a extends from the chamber 35.

A fluid retaining ring 37 is secured upon one side to the bracket 17 and bridges the gap between said bracket and the rotatable cover plate 12 on the turbine member 4 for retaining fluid. It will be noted that the hub of the plate 12 is formed with a groove 12a to which fluid may flow from passage 12b and chamber 13. The fluid collecting in the retainer ring 37 can be drained thru housing 39 and drain pipe 40 to the fluid tank 41 (Fig. 1).

The fluid tank 41 which in the present instance is designed to hold oil is connected with a motor driven centrifugal pump 42 which can continue to operate even when its discharge line is closed by a valve as occurs during the operation of the system. For this purpose, a by-pass 42a connects the pump with the tank 42 for the escape of oil and air during churning in the pump when the discharge line is closed. The oil pump 42 discharges into pipe line 43 which is connected to the selector valve housing 22 at the inlet port 43a. This discharge pipe is preferably provided with an adjustable globe valve 43b. Fluid is adapted to be fed from the valve housing 22 thru port 44a and pipe 44 to inlet chamber 19 in bracket 17.

The aforementioned fluid return pipe 36 communicates with a return port 46 in the selector valve housing 22. Just above the port 46, there is a return pipe 47 leading to the tank 41 and which pipe may be considered a continuation of return pipe 36. The pipe 47 extends from a fluid return port 47a in housing 22.

Within the valve housing 22, there is a spool valve 48 secured upon a rod 49 for controlling the above mentioned ports. The heads 50 of the valve co-operate with the main valve portion to form the fluid receiving and discharging compartments. The valve rod 49 is connected by a lost motion connection with a lever 53. It will be noted that the connection occurs intermediate the ends of the lever and that one end is pivoted at 54 while the other end is slidably connected to a power rod 55 extending into a power cylinder 56 where it is provided with a piston 57.

The power cylinder 56 constitutes part of a well known regulator of the pressure actuated type and requires only a brief description. The pressure regulator in addition to the power cylinder 56 comprises a housing 58 having a pressure chamber 59 which is in communication with the discharge line 60 of the driven pump 1 thru the pipe 61. The pressure of the discharge line is directly transmitted to the diaphragm 62 extending across the chamber. The pressure acting against the diaphragm will cause a movement thereof which will be transmitted to a four-way valve 63 thru rod 64 secured to the diaphragm, the rod 64 operating a floating lever 65 which controls the valves. This four-way valve controls the fluid for operating the power piston 57. To this end, the valve housing communicates with the power cylinder upon each side of the piston thru the pipes 66 and 67.

The piston rod 55 is connected by a link lever 68 with a compensating lever 69 in the housing 58. This compensating lever 69 is in turn connected by a roller chain to a compensating spring 71 which is connected to the rod 64. The force of this spring 71 is opposed to the force of the compression spring 72 on the diaphragm and in a manner controls the spring load thereon.

The regulator in the present instance is operated from the pressure in the pump. To this end, the pressure pipe 61 is connected by a pipe 73 with the four-way valve whereby one side of the power piston may be energized and the other side exhausted for properly operating the rod 49.

During the operation of the apparatus, assuming that it is used for pumping water, the desired pressure in the pump is predetermined by engineers and it must be kept at the selected pressure. In such condition, the lever 53 will be in normal or neutral position as shown in the intermediate position N in Fig. 1. Now if the pressure in the discharge line should rise, the diaphragm 62 will be moved to cause the operation of the four-way valve so as to allow fluid under pressure from pipe 73 to flow into the correct side of the power piston 57 while exhausting the other side and operating the piston for moving lever 53 to full line position for opening the fluid return port 46 and closing the fluid feed port 43a with the result that the fluid expelling mechanism in the chamber 13 will exhaust fluid from the coupling thru pipes 36 and 47 back to the tank. Fluid will be exhausted from the coupling until the speed of the driven pump 1 decreases to a point where the pressure again becomes normal at which time, the diaphragm will return to its normal position and all other parts will likewise return to normal or neutral positions, the valve 48 closing the ports 43a and 46 thereby preventing the flow of fluid to or from the coupling.

Should the pressure in the discharge line drop, the regulator will act to raise the rod 55 and lever 53 to the upper dotted line position thereby closing return port 46 and opening feed port 43a whereby fluid can be pumped into the coupling for increasing its effectiveness for operating the pump at a greater speed for raising the pump pressure to the selected pressure. When the pressure becomes normal again, the parts will be automatically returned to neutral or normal positions. Thus a predetermined pressure can always be maintained.

From the foregoing, it will be evident that a novel fluid control for a fluid coupling has been invented that automatically regulates the fluid in a coupling to increase or decrease the speed of the driven member in accordance with the result or work produced by such driven member.

It will be appreciated that such an automatic control will maintain a predetermined pressure in a water system without the attention of an attendant and that material saving and economy will be effected.

I am aware that many changes may be made and various details of construction may be modified within the spirit of this invention so I do not propose limiting the patent granted thereon otherwise than necessitated by the appended claims.

I claim as my invention:

1. In an apparatus of the class described, a rotary shaft, a rotary member having an annular liquid containing chamber with an inclined wall secured to said shaft, a stationary and annular liquid expeller in said chamber having a hub portion surrounding said shaft and an inclined portion in said chamber adjacent the inclined wall of said member, said member having an annular channel-like passage extending therethrough and having spaced vanes extending from said inclined portion and beyond the end of said passage for impelling fluid into said passage during the normal operation of said shaft.

2. In an apparatus of the class described, a rotary shaft, a liquid containing casing secured to said shaft and having a wall sloping toward said shaft, a stationary and annular liquid expeller surrounding said shaft within said chamber and having a sloping portion within said chamber adjacent said sloping wall, said expeller having a channel-like discharge passage extending lengthwise thereof and co-extensive with its circumferential extent and means projecting from its sloping portion beyond the end of said passage for scooping fluid into said channel-like passage during the normal operation of said shaft.

3. In an apparatus of the class described, a rotary shaft, a liquid containing casing secured to said shaft and having a wall portion inclined toward said shaft, a stationary and annular fluid expeller surrounding said shaft within said casing and having a sloping portion adjacent said sloping wall portion, said expeller having an annular passage extending therethrough and means extending from said inclined portion for scooping liquid into said annular passage during the normal operation of said shaft.

4. In a device of the class described, a rotary liquid containing casing having a sloping flange converging toward the rotary axis thereof, an annular stationary liquid expeller located in said casing and comprising spaced members forming an annular passage therebetween, said expeller having a sloping portion adjacent said sloping flange and spaced vanes projecting from said passage adapted for directing liquid therein.

5. In a device of the class described, a rotary liquid containing casing having an annular sloping flange converging toward the rotary axis thereof, an annular stationary liquid expeller in said casing and comprising spaced member defining an annular passage therebetween, said expeller having a sloping terminal portion with vanes for directing liquid into said passage, and means forming an axial discharge passage from said expeller.

WALTER BUEHLER.

REFERENCES CITED

The following references are of record in the file of this patent:

UNITED STATES PATENTS

| Number | Name | Date |
| --- | --- | --- |
| 2,220,321 | Eddins | Nov. 5, 1940 |
| 2,178,864 | Rosenberger | Nov. 7, 1939 |
| 2,092,092 | Sinclair et al. | Sept. 7, 1937 |
| 2,265,806 | Goldschmied | Nov. 9, 1941 |
| 1,859,607 | Sinclair | May 24, 1932 |
| 2,281,161 | Kuhns | Apr. 28, 1942 |
| 2,299,049 | Ziebolz | Oct. 13, 1942 |
| 2,343,786 | Martin | Mar. 7, 1944 |
| 1,441,589 | Krogh | Jan. 9, 1923 |
| 1,947,658 | Pizzuto | Feb. 20, 1934 |
| 690,100 | Chodzko | Dec. 31, 1901 |
| 2,376,071 | Miess | May 15, 1945 |

FOREIGN PATENTS

| Number | Country | Date |
| --- | --- | --- |
| 374,638 | Great Britain | 1932 |
| 531,372 | France | 1922 |
| 492,854 | Great Britain | Sept. 28, 1938 |